United States Patent
Iqbal et al.

(10) Patent No.: US 11,520,615 B1
(45) Date of Patent: Dec. 6, 2022

(54) VIRTUAL NETWORK FUNCTION VIRTUAL DOMAIN ISOLATION

(71) Applicant: Equinix, Inc., Redwood City, CA (US)

(72) Inventors: Syed Hashim Iqbal, San Jose, CA (US); Muhammad Durrani, San Jose, CA (US); Janardhana Achladi, San Jose, CA (US); Rizwan Jamal, San Jose, CA (US)

(73) Assignee: EQUINIX, INC., Redwood City, CA (US)

( * ) Notice: Subject to any disclaimer, the term of this patent is extended or adjusted under 35 U.S.C. 154(b) by 301 days.

(21) Appl. No.: 16/836,777

(22) Filed: Mar. 31, 2020

(51) Int. Cl.
| | |
|---|---|
| G06F 9/455 | (2018.01) |
| H04L 41/0803 | (2022.01) |
| H04L 41/0893 | (2022.01) |
| H04L 61/256 | (2022.01) |
| H04L 9/40 | (2022.01) |
| H04L 12/46 | (2006.01) |

(52) U.S. Cl.
CPC ...... G06F 9/45558 (2013.01); H04L 12/4641 (2013.01); H04L 41/0803 (2013.01); H04L 41/0893 (2013.01); H04L 61/2571 (2013.01); H04L 63/0884 (2013.01); H04L 63/101 (2013.01); H04L 63/168 (2013.01); G06F 2009/45595 (2013.01)

(58) Field of Classification Search
CPC ....... G06F 9/45558; G06F 2009/45595; H04L 12/4641; H04L 12/0803; H04L 12/0893; H04L 61/2571; H04L 63/0884; H04L 63/101; H04L 63/168
See application file for complete search history.

(56) References Cited

U.S. PATENT DOCUMENTS

| | | |
|---|---|---|
| 9,886,267 B2 | 2/2018 | Maheshwari et al. |
| 9,948,552 B2 | 4/2018 | Teng et al. |
| 10,129,078 B2 | 11/2018 | Kumar et al. |

(Continued)

OTHER PUBLICATIONS

Pitaev et al., "Multi-VNF performance characterization for virtualized network functions", IEEE Conference on Network Softwarization, IYIy 3rd, 2017.*

(Continued)

Primary Examiner — Todd L Barker
(74) Attorney, Agent, or Firm — Shumaker & Sieffert, P.A.

(57) ABSTRACT

Techniques for virtualized network functions (VNFs) that provide for domain isolation of networks coupled to the VNF are described. A virtual network function (VNF) includes a cloud virtual domain coupling the VNF to a cloud service, a management virtual domain coupling the VNF to a management service, and an external virtual domain having a public Internet Protocol (IP) address. The external virtual domain receives an authentication request providing access credentials for a VNF customer from a cloud client device, provides the authentication request to the management service via the management virtual domain, receives an authentication response from the management service, and, in response to determining that the VNF customer access credentials are valid, initiates application of a policy that allows the cloud client device to configure the cloud virtual domain or the cloud service and disallows configuration of the external virtual domain and the management virtual domain.

20 Claims, 5 Drawing Sheets

(56) References Cited

U.S. PATENT DOCUMENTS

| | | | | |
|---|---|---|---|---|
| 10,721,258 | B2* | 7/2020 | Sood | H04L 63/1425 |
| 10,798,063 | B2* | 10/2020 | Bonomi | G06F 21/57 |
| 11,316,822 | B1* | 4/2022 | Gawade | G06F 11/2025 |
| 2017/0250870 | A1* | 8/2017 | Zhao | H04L 63/20 |
| 2018/0115519 | A1* | 4/2018 | Bonomi | H04L 63/1458 |
| 2018/0139095 | A1* | 5/2018 | Wen | H04W 12/08 |
| 2019/0222611 | A1* | 7/2019 | Lin | H04L 12/66 |
| 2021/0194847 | A1* | 6/2021 | Gu | H04L 61/301 |
| 2021/0200600 | A1* | 7/2021 | Thakkar | G06F 9/5027 |
| 2022/0109745 | A1* | 4/2022 | Zhang | H04L 69/22 |
| 2022/0116267 | A1* | 4/2022 | Tada | H04L 45/306 |

OTHER PUBLICATIONS

Boubendir et al., "On Demand, dynamic and at-the-edge VNF deployment model application to Web Real-Time Communications", 2016 12th Conference on Network and Service Management, Oct. 2016.*

Yan et al., "Cloudification and Security Implications of TaaS", 2015 World Symposium on Computer Networks and Information Secuirty (WSCNIS), Sep. 19, 2015.*

He et al., "NFV Security Survey: From Use Case Driven Threat Analysis to State of the Art Countermeasures", IEEE Communications Surveys and Tutorials, vol. 20,k Issue:4, Jul. 25, 2018.*

Press release from Equinix entitled "Equinix Unveils Virtual Network Services on Platform Equinix—Network Edge Services Modernize Networks Virtually, Within Minutes, at the Digital Edge," Jun. 2019, 6 pp. accessed from https://www.equinix.com/newsroom/press-releases/pr/123747/Equinix-Unveils-Virtual-Network-Services-on-Platform-Equinix/, on Jul. 15, 2020.

U.S. Appl. No. 62/908,976, filed Oct. 1, 2019, naming inventors Kempf et al.

* cited by examiner

VIRTUAL NETWORK FUNCTION VIRTUAL DOMAIN ISOLATION

TECHNICAL FIELD

The disclosure relates to computer networks and, more specifically, to Virtual Network Functions provided on computer networks.

BACKGROUND

A network operator may provide a Network Functions Virtualization (NFV) architecture or infrastructure (NFVi) that may include multiple virtualized network functions (VNFs). A VNF may provide firewall, routing, carrier grade network address translation (CG-NAT), performance enhancement proxies for video, transport control protocol (TCP) optimization and header enrichment, caching, load balancing, or other network functions, for example. A VNF may be executed by one or more virtual machines, containers, or other execution environment of the NFV Infrastructure. In this way, virtualized network functions may be executed by servers, switches, storage devices, and cloud computing infrastructure, instead of having custom hardware appliances for each network function.

SUMMARY

In general, this disclosure describes techniques for virtualized network functions (VNFs) to provide for domain isolation of networks coupled to the VNF. A VNF may provide virtualized routing, switching, firewall services, or other network functions for a customer or tenant of a data center. Network traffic may arrive at a public Internet Protocol (IP) address for a VNF. The VNF may include an external virtual domain, a management virtual domain, and a cloud virtual domain. The management virtual domain may communicatively couple the VNF to a private management network. The cloud virtual domain may communicatively couple the VNF to a private cloud network. The external virtual domain may determine whether network traffic to the VNF is authorized and/or authenticated by issuing authentication/authorization requests to the management virtual domain, which may authenticate a client using a management service accessible via the private management network. The external virtual domain may relay network traffic related to cloud services to the cloud virtual domain. Thus, the VNF may have isolated virtual domains that separate management and cloud service data for the VNF.

The aspects described above, and further aspects described herein may provide one or more technical advantages that present at least one practical application. For example, isolating the virtual domains and performing intra-virtual domain forwarding within a VNF and using separate virtual networks for receiving external traffic, handling management traffic and operations, and for handling cloud traffic may improve a security of customer/tenant authentication. As another example, by providing the customer/tenant with full control over the cloud virtual domain while restricting customer/tenant control of the external and management virtual domains, a NFVi provider (e.g., a public cloud infrastructure or other data center provider) that deploys the VNF on behalf of the tenant can facilitate correct network configuration and other configuration and operation of the VNF on the NFVi to provide authentication to the NFVi provider authentication system, while simultaneously allowing the tenant/customer flexibility over the VNF packet processing operations, e.g., the network function(s). As another example, the techniques described herein may facilitate cloud-to-cloud routing, migrating from one cloud to another, providing a cloud firewall, and interconnecting branch offices with corporate cloud resources in a secure manner. Further, the techniques described herein can facilitate service level agreements for cloud to cloud data transfers (e.g., in cloud-to-cloud routing).

In some examples, a computing device includes processing circuitry coupled to a memory; a virtual network function (VNF) configured for execution by the processing circuitry, wherein the VNF comprises: a cloud virtual domain communicatively coupling the VNF to a cloud service; a management virtual domain communicatively coupling the VNF to a management service; and an external virtual domain having a public Internet Protocol (IP) address, the external virtual domain configured to: receive, from a cloud client device on a public network, an authentication request providing access credentials for a VNF customer, provide the authentication request to the management service via the management virtual domain, receive an authentication response from the management service via the management virtual domain, in response to a determination that the authentication response indicates the access credentials are valid credentials for a VNF customer, initiate application of a policy that allows the cloud client device to configure the cloud virtual domain or the cloud service and disallows configuration of the external virtual domain and the management virtual domain.

In some examples, a system includes a private cloud network; a private management network; and a virtualized network function (VNF) communicatively coupled to the public gateway, the VNF comprising: a cloud virtual domain communicatively coupling the VNF to a cloud service via the private cloud network, a management virtual domain communicatively coupling the VNF to a management service via the private management network, and an external virtual domain configured to: receive, from a cloud client device via a public network, an authentication request providing access credentials for a VNF customer, provide the authentication request to the management service via the management virtual domain, receive an authentication response from the management service via the management virtual domain, in response to a determination that the authentication response indicates the access credentials are valid credentials for a VNF customer, initiate application of a policy that allows the cloud client device to configure the cloud virtual domain or the cloud service and disallows configuration of the external virtual domain and the management virtual domain.

In some examples, a method includes receiving, by an external virtual domain of a virtualized network function (VNF) executable by one or more processors, an authentication request from a cloud client device on a public network, the authentication request include access credentials; providing the authentication request to a management service via a management virtual domain of the VNF; receiving an authentication response from the management service via the management virtual domain; and in response to determining that the authentication response indicates the access credentials are valid credentials for a VNF customer, initiating application of a policy that allows the cloud client device to configure the cloud virtual domain or the cloud service and disallows the cloud client device from configuration of the external virtual domain and the management virtual domain.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
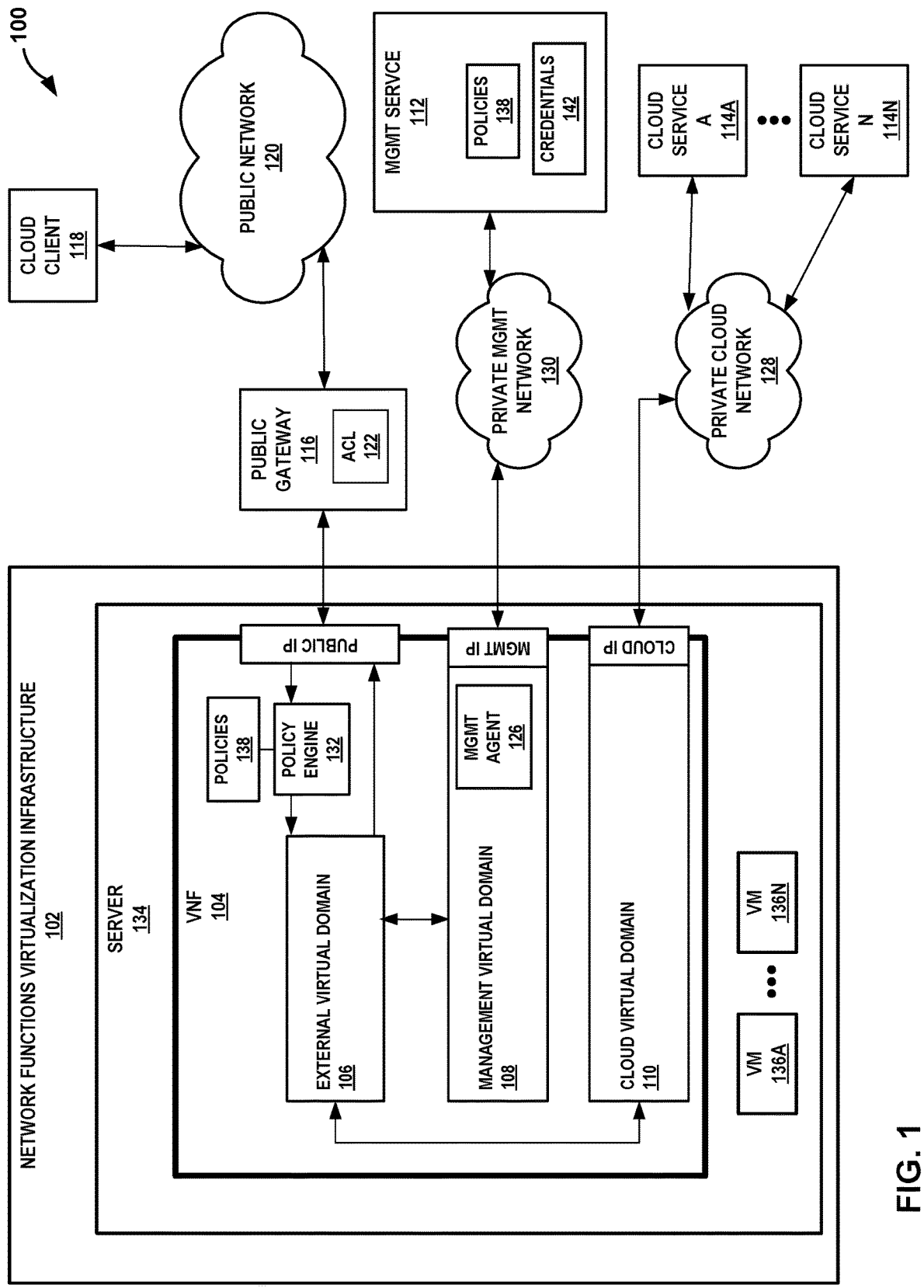
FIG. 1 is a block diagram that illustrates an example Virtual Network Function having isolated virtual domains according to techniques described herein.

FIG. 1 is a block diagram that illustrates a system 100 including an example Virtual Network Function (VNF) 104 having isolated domains according to techniques described herein. In the example of FIG. 1, system 100 includes Network Functions Virtualization infrastructure (NFVi) 102, public gateway 116, private management network 130, and private cloud network 128. In some aspects, NFVi 102, public gateway 116, private management network 130, and private cloud network 128 may be provided in a data center environment.

NFVi 102 may deploy one or more services, such as Virtualized Network Functions. NFVi 102 includes computing hardware, storage hardware, and network hardware for executing VNFs. In some examples, NFVi 102 further includes a virtualization layer over the hardware to offer virtual computing, virtual storage, and virtual network for executing VNFs. NFVi 102 may be executed by one or more computing devices in a centralized or distributed manner. In the example of FIG. 1, NFVi 102 platform includes servers, e.g., server 134, running virtualization software (e.g., hypervisors) that enable virtual execution environments on which VNF images (including the network infrastructure software) are deployed. Server 134 may provide one or more virtual machines 136A-136N (collectively, "VMs 136"). Each of VMs 136 emulates hardware. In other words, each of VMs 136 provides a virtualized operating system and application suite (e.g., to deploy VNFs) for customer access. Alternatively, or additionally, each of servers 134 may provide containers (e.g., such as those provided by the open source Docker Container application), or other virtual execution environments in which VNFs are implemented.

VNF 104 may provide similar functionality to hardware-based network devices such as dedicated network appliances, but VNFs provide such functionality in software. A VNF is primarily a software construct and thus may be decoupled from the underlying hardware. For example, a VNF 104 can provide the same routing, switching firewall, intrusion detection or other services that have traditionally been provided by specialized hardware, but in software. VNF 104 can provide forwarding and network address translation services for network traffic to and from the VNF 104.

Private management network 130 may communicatively couple a VNF 104 to one or more management services 112. Private management network 130 may be behind a gateway (e.g., public gateway 116) with respect to a public network 120, and thus generally hidden from or otherwise unavailable to devices on the public network 120. For example, private management network 130 may require authentication and/or authorization before a device is allowed to communicate to a management service 112 coupled to the private management network 130. Private management network 130 and private cloud network 128 may represent virtual or overlay networks configured to operate over a single physical network, such as a cloud exchange or data center infrastructure network.

In some aspects, management service 112 can include an authentication and/or authorization service. Other examples of a management service 112 include a configuration service, licensing service, update service and other services used in the management of network resources and devices. Management service 112 can maintain credentials 142 used to authenticate an authorize VNF users and administrators. For example, credentials 142 may include username/password combinations. Management service 112 may also maintain policies 138. Policies 138 may define rules, configurations etc. that define the access that an authenticated user has to various resources associated with VNF 104. In some aspects, a management service 112 may be a Terminal Access Controller Access-Control System (TACACS) service provided by one or more TACACS servers. A TACACS can provide centralized access control services for devices, including VNFs, on one or more networks. Management service 112 may also be a TACACS+ or XTACACS service.

Private cloud network 128 may communicatively couple VNF 104 to one or more cloud services (e.g., cloud service 114A-114N, generically referred to as a cloud service 114). Like private management network 130, private cloud network 128 may be generally hidden from or otherwise unavailable to devices on a public network such as public network 120. For example, private cloud network 128 may require authentication and/or authorization before a device is allowed to communicate to a cloud service 114 coupled to the private cloud network 128. Examples of cloud services include Google Cloud, Azure, Oracle Cloud, Amazon Web Services (AWS), IBM Cloud, Alibaba Cloud, and Salesforce. In some aspects, private cloud network 128 can be an Equinix Cloud Exchange Fabric provided by Equinix Inc. of Redwood, Calif.

Public gateway 116 may communicatively couple VNF 104 to a public network 120. Public network 120 may be a network that is publicly available with few or no restrictions. For example, public network 120 may be a network that is part of the Internet.

In accordance with techniques described in this disclosure, in some aspects, VNF 104 may include an external virtual domain 106, a management virtual domain 108, and a cloud virtual domain 110. These virtual domains may be used as further described below to isolate network traffic to and from a public network such as public network 120 such that the network traffic is relayed to an appropriate virtual domain and prevented from reaching inappropriate virtual domains.

Management virtual domain 108 manages network traffic to and from management services communicatively coupled to VNF 104 via private management network 130. Management virtual domain may process network traffic that includes authentication and authorization requests for VNF 104. Management virtual domain may use a management IP address as a source address when communicating over private management network 130.

Cloud virtual domain 110 manages network traffic to and from cloud services 114 communicatively coupled to VNF via private cloud network 128. VNF 104 may utilize cloud virtual domain 110 to provide a variety of capabilities with respect to cloud services 114 communicatively coupled to VNF 104 via cloud virtual domain 110 and private cloud network 128. For example, VNF 104 may utilize cloud virtual domain 110 to facilitate cloud-to-cloud routing, migrating from one cloud to another, providing a cloud firewall, and interconnecting branch offices with corporate cloud resources. Cloud virtual domain 110 may use a cloud IP address as a source address when communicating over private cloud network 128.

External virtual domain 106 manages network traffic to and from a public network 120. In some aspects, external virtual domain 106 is associated with a public Internet Protocol (IP) address for VNF 104. External virtual domain 106 may receive network traffic having a destination IP address of the public IP address associated with VNF 104. In some implementations, the public IP address can be a loopback address such as a loopback10 address. In such implementations, multiple VNFs on a system can each have a distinct public IP address that shares a single physical network interface.

External virtual domain 106 can apply rules, algorithms, heuristics, routing tables etc. to data in network packets to determine whether the network packet is to be relayed, and if so, which domain is to receive the network traffic. In some aspects, external virtual domain 106 can inspect packet headers, and determine an appropriate virtual domain based on the IP address and/or port information in the destination portion of the packet header. As an example, network traffic having a secure shell (SSH) port may be relayed to the management virtual domain 108. Similarly, external virtual domain 106 can determine, based on information in the network packet, that the network packet should be relayed to cloud virtual domain 110.

In some examples, virtual domains may include a virtual routing and forwarding (VRF) instance having an interface to the corresponding network. For example, external virtual domain 106 has an interface having a public IP address on the public network 120. Management virtual domain 108 has an interface with a management IP address on private management network 130. Cloud virtual domain 110 has an interface with a cloud IP address on private cloud network 128. In some examples, the VRFs of the virtual domains are configured with intra-VRF forwarding (e.g., route leaking) of traffic based on properties of the traffic. For example, a VRF instance for cloud virtual domain 110 may forward cloud service traffic to a VRF instance for external virtual domain 106, and vice-versa. Alternatively, in some examples, traffic received at the public IP address for external virtual domain 106 from cloud client 118 may be processed using the network function of VNF 104 prior to forwarding via the interface of the VRF instance for cloud virtual domain 110 to a destination one of cloud services 114. A similar process may be applied in the reverse direction from a cloud server 114 to cloud client 118.

In some examples, virtual domains may include a virtual firewall instance. For example, external virtual domain 106 may be a virtual firewall the receives network traffic via the public IP address of VNF 104. The virtual firewall may implement various rules to determine whether and how network traffic received via the public IP address passes through external virtual domain 106.

In some aspects, external virtual domain 106 may receive an authentication request from cloud client 118 to allow cloud client 118 to access the networks associated with a virtual domain (e.g., cloud virtual domain 110) before relaying the network traffic to the cloud virtual domain 110. As an example, cloud client 118 may provide a username/password combination that can be authenticated by management service 112. Cloud client 118 may be any type of network device communicatively coupled to public network 120. External virtual domain 106 may relay the authentication request provided by cloud client 118 to management service 112 to determine if cloud client 118 is authenticated and/or authorized to access the private cloud network 128 via cloud virtual domain 110. Once authenticated and/or authorized, the external virtual domain 106 may relay future cloud network traffic to the private cloud network 128 via the cloud virtual domain 110.

External virtual domain 106 may be handle an authentication request received via the public IP address in various ways depending on how virtual domain 106 is configured. For example, in some implementations where domain 106 may be configured as a VRF, external virtual domain 106 may perform network address translation on the authentication request such that authentication request network packets have a source IP address comprising the management IP address, and a destination IP address comprising an IP address of the management service 112.

In some implementations such as when external virtual domain 106 is configured as a virtual firewall, a firewall rule may indicate that a management agent 126 of management virtual domain 108 is to process the authentication request. Management agent 126 generates an authentication request having the same credentials as that include in the authentication request received at the public IP. Management agent 126 sends the authentication request to management service 112 via private domain network 130 using its own management IP address as a source address.

If authentication and/or authentication is successful, management service 112 may install policies 138 on VNF 104 for evaluation by a policy engine 132. The policies may determine the level of access to VNF 104 and external virtual domain 106 of VNF 104 provided to a cloud client 118. For example, the policies may allow cloud client 118 to access and configure resources on cloud network 128 such as the cloud virtual domain 110 and cloud services 114. Further, the policies may disallow access by cloud client 118 to the management virtual domain 108 and resources on private management network 130. As another example, a data center administrator may also provide credentials that when authenticated, provide the data center administrator access to the external virtual domain 106, management virtual domain 108, cloud virtual domain 110, and the resources available via the respective virtual domains. As an example, the policies may restrict the cloud client 118 to using certain interfaces such as interfaces associated with the cloud virtual domain 110 and prevent the cloud client 118 from using interfaces associated with the external virtual domain 106 or the management virtual domain 108. As a further example, the policies may limit the command language interpreter (CLI) commands that may be executed by the cloud client 118 to commands that affect the cloud virtual domain 106 and prevent the cloud client 118 from executing CLI commands that would affect the external virtual domain 106 or the management virtual domain 108.

VNF 104 may receive network traffic from a public gateway 116. As an example, public gateway 116 may provide a network interface to public network 120 and provide gateway functions for a data center (not shown) that hosts VNF 104 (e.g., hosts a physical or virtual machine upon which VNF 104 resides). Public gateway 116 may receive traffic having a destination address of a device within the data center from a public network 120. In some aspects, public gateway 116 may utilize an access control list (ACL) 122 to determine if the source of the network traffic is permitted to access virtual and physical devices in the data center. For example, public gateway 116 may determine, using ACL 122, if a cloud client 118 is permitted to access VNF 104 using the VNF's public IP address.

In one example implementation, a tenant of a data center may be associated with VNF 104. The tenant may utilize some of the physical resources (bare metal servers, communication infrastructure etc.) provided by the data center. Such physical resources may be referred to as in-premise resources. Cloud client 118 may be a computing device located in a branch office of the tenant or otherwise associated with the tenant or customer. The branch office may not be directly associated with any of the infrastructure provided by the data center and may thus be referred to as an off-premise client. However, despite being off-premise, cloud client 118 can utilize the above-described VNF 104, including the virtual domains provided by VNF 104 to configure cloud virtual domain 110 of VNF 104, and configure and utilize cloud services associated with VNF 104 in a secure manner.

Other virtual domains may be present in addition to, or instead of, the virtual domains of the example system 100 illustrated in FIG. 1. For example, VNF 104 may include an Internet exchange virtual domain that couples the VNF 104 to an Internet exchange network or fabric.

In the example illustrated in FIG. 1, one server 134 and one VNF 104 have been shown. It is noted that a typical NFVi infrastructure may include more than one server, and the servers may include more than one VNF.

Figure 2:
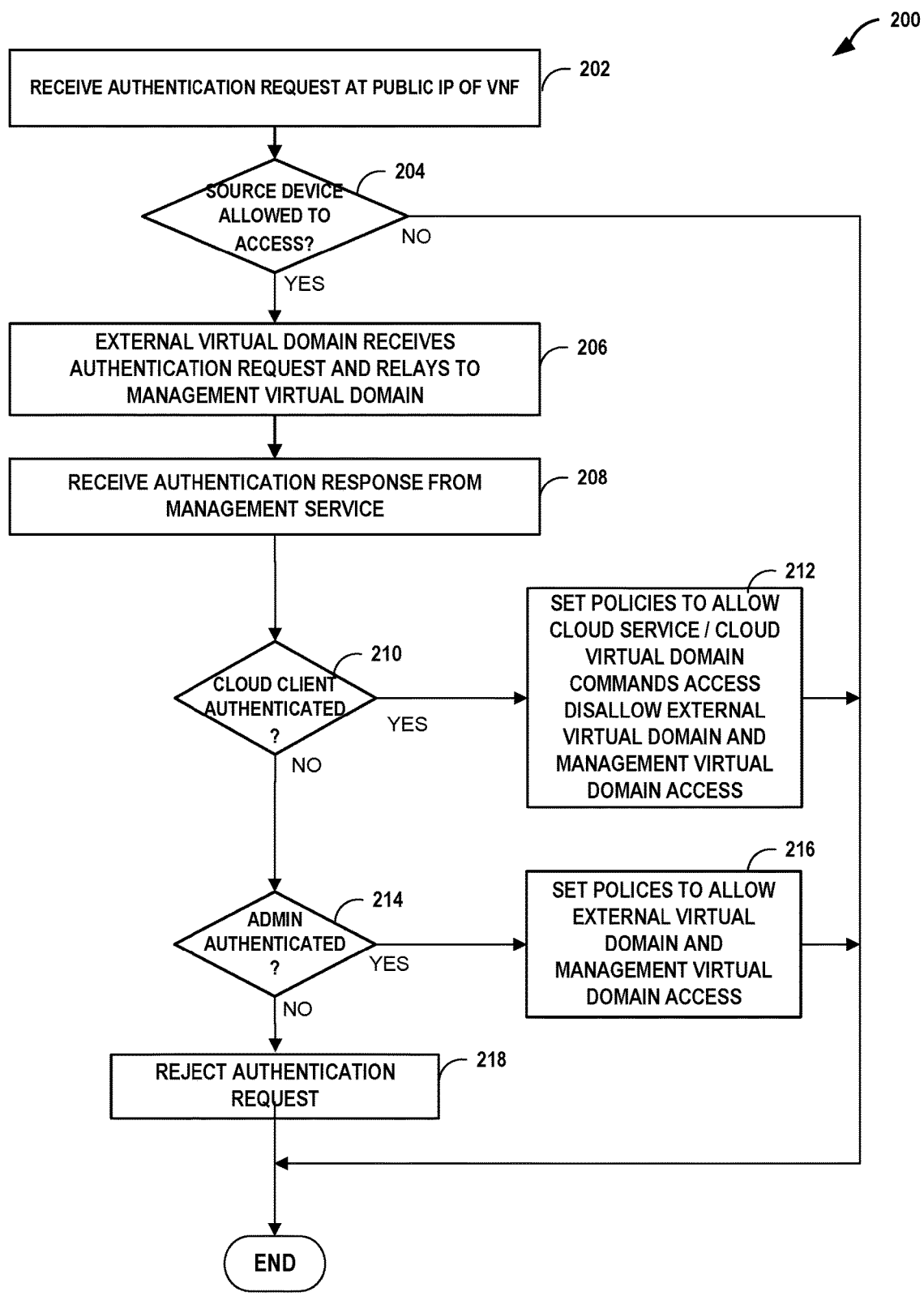
FIG. 2 is a flowchart illustrating example operations for communications using different virtual domains of an example Virtual Network Function according to techniques described herein.

FIG. 2 is a flowchart illustrating example operations for isolating virtual domains of a VNF 104 according to techniques described herein. The example operations may be performed when an authentication request to access VNF 104 is received from a source device on the opposite side of a public gateway 116 (202). In some aspects, VNF 104 may be implemented on a physical or virtual machine in a data center. The data center may include a public gateway 116 that receives network packets from a public network that have a destination address for VNF 104 (e.g., a public IP address of VNF 104). In some aspects, public gateway 116 may determine if the source device sending the authentication request is allowed to access devices behind public gateway 116 (204). For example, public gateway 116 may inspect network packet header data of the authentication request to determine a source of the authentication request. Public gateway 116 may consult an ACL or other access control mechanism to determine if the source of the authentication request is allowed to access devices behind public gateway 116. If the source of the authentication request is not allowed to access devices behind public gateway 116 ("NO" branch of 204), the authentication request may be rejected, and the method ends. If the source of the authentication request is allowed to access devices behind public gateway 116 ("YES" branch of 204), the authentication request may be forwarded to external virtual domain 106.

In some aspects, external virtual domain 106 may be configured to receive and process network traffic addressed to VNF 104's public IP address. As discussed above, external virtual domain 106 may apply rules, heuristics, routing tables, etc. to network traffic to determine how the network traffic is to be relayed. The authentication request may be received using the secure shell (SSH) protocol. In some aspects, external virtual domain 106 determines, from network packet header data for the authentication request, if the network packet is an SSH packet by determining if the destination port identifier is an SSH port. Other indicators may be used by external virtual domain 106 to determine if an authentication request has been received. For example, other port identifiers may indicate an authentication request.

If external virtual domain 106 determines that an authentication request has been received, external virtual domain 106 can relay the authentication request to management virtual domain 108 (206). As discussed above, in some aspects, external virtual domain 106 can examine the network packet header data of the authentication request to determine if the network packet indicates an SSH port. Upon receiving the authentication request from the external virtual domain 106, management virtual domain 108 can provide the authentication request to a management service 112 via the private management network (208). In some aspects, the management virtual domain 108 may relay the authentication request after the external virtual domain 106 has performed network address translation on the authentication request to translate the source and destination IP addresses to the management virtual domain and management service 112 respectively. In some aspects, the external virtual domain 106 may cause a management agent 126 to generate an authentication request using the credentials received by the external virtual domain 106.

The management service 112 can compare the credentials supplied in the authentication request with cloud client credentials maintained by the management service (210). If the authentication request for the cloud client is approved ("YES" branch of 210), the management service 112 can instantiate policies associated with the authenticated cloud client (212). In some aspects, the policies may be instantiated on the VNF 104 and enforced by a policy agent of the VNF 104. For example, the policies may specify that the cloud client can access resources associated with the cloud virtual domain and services and cloud services accessible via the cloud virtual domain, and restrict the cloud client from accessing resources associated with the external virtual domain and management virtual domain. Such resources can include CLI commands and network interfaces.

The credentials may not be for a cloud client ("NO" branch of 210). For example, the credentials may be associated with an administrator, such as a network administrator or data center administrator. If administrator credentials are authenticated ("YES" branch of 214) the management service 112 can instantiate policies associated with the authenticated administrator (216). In some aspects, the policies may be instantiated on the VNF 104 and enforced by a policy agent of the VNF 104. For example, the policies may specify that the administrator can access resources associated with the management virtual domain and external virtual domain.

If a user (e.g., either administrator or cloud client) is not authenticated ("NO" branch of 214), the authentication request may be rejected by the management service 112, and access to VNF 104 may be denied.

Figure 3:
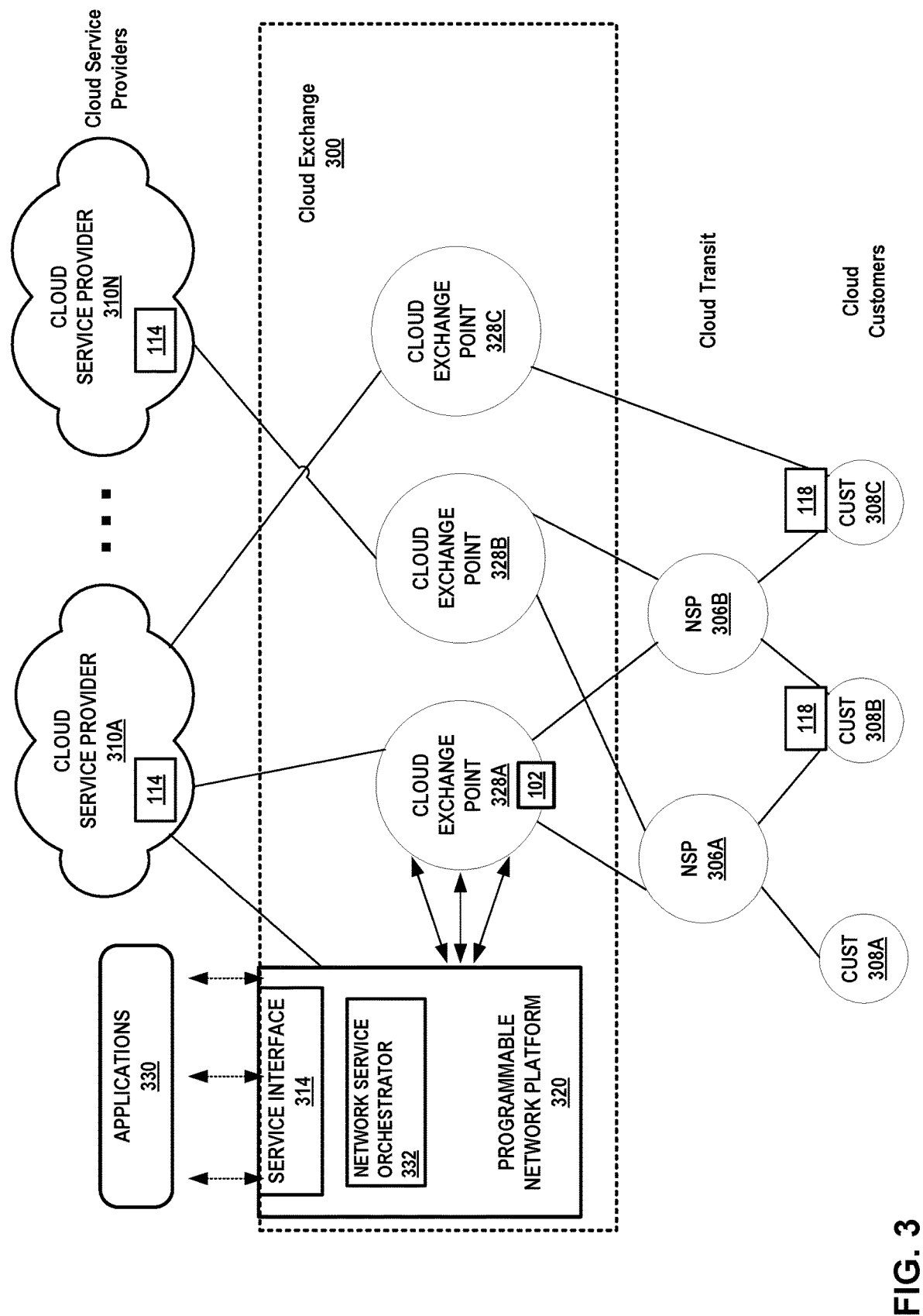
FIG. 3 is a block diagram that illustrates a conceptual view of a network system having a metro-based cloud exchange that provides multiple cloud exchange points according to techniques described herein.

FIG. 3 illustrates a conceptual view of a network system having a metro-based cloud exchange that provides multiple cloud exchange points according to techniques described herein. The multiple cloud exchange points may be used to implement, at least in part, a NFVI 102. Each of cloud-based services exchange points 328A-328C (described hereinafter as "cloud exchange points" and collectively referred to as "cloud exchange points 328") of cloud-based services exchange 300 ("cloud exchange 300") may represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide resilient and independent cloud-based services exchange by which cloud-based services customers ("cloud customers") and cloud-based service providers ("cloud providers") connect to receive and provide, respectively, cloud services. In various examples, cloud exchange 300 may include more or fewer cloud exchange points 328. In some instances, a cloud exchange 300 includes just one cloud exchange point 328. As used herein, reference to a "cloud exchange" or "cloud-based services exchange" may refer to a cloud exchange point. A cloud exchange provider may deploy instances of cloud exchanges 300 in multiple different metropolitan areas, each instance of cloud exchange 300 having one or more cloud exchange points 328.

Each of cloud exchange points 328 includes network infrastructure and an operating environment by which cloud customers 308A-308C (collectively, "cloud customers 308") receive cloud services from multiple cloud service providers 310A-310N (collectively, "cloud service providers 310"). The cloud service provider 310 may host one of more cloud services 114. As noted above, the cloud service providers 310 may be public or private cloud service providers.

Cloud exchange 300 provides customers of the exchange, e.g., enterprises, network carriers, network service providers, and SaaS customers, with secure, private, virtual connections to multiple cloud service providers (CSPs) globally. The multiple CSPs participate in the cloud exchange by virtue of their having at least one accessible port in the cloud exchange by which a customer may connect to the one or more cloud services offered by the CSPs, respectively. Cloud exchange 300 allows private networks of any customer to be directly cross-connected to any other customer at a common point, thereby allowing direct exchange of network traffic between the networks of the customers.

Cloud customers 308 may receive cloud-based services directly via a layer 3 peering and physical connection to one of cloud exchange points 328 or indirectly via one of network service providers 306A-306B (collectively, "NSPs 306," or alternatively, "carriers 306"). Cloud customers 308 may include customers associated with a VNF 104 as described above. For example, cloud customers 308 may include systems used by any or all of customer devices used by cloud client 118 to access cloud services 114 via VNF 104. NSPs 306 provide "cloud transit" by maintaining a physical presence within one or more of cloud exchange points 328 and aggregating layer 3 access from one or customers 308. NSPs 306 may peer, at layer 3, directly with one or more cloud exchange points 328 and in so doing offer indirect layer 3 connectivity and peering to one or more customers 308 by which customers 308 may obtain cloud services from the cloud exchange 300. Each of cloud exchange points 328, in the example of FIG. 3, is assigned a different autonomous system number (ASN). For example, cloud exchange point 328A is assigned ASN 1, cloud exchange point 328B is assigned ASN 2, and so forth. Each cloud exchange point 328 is thus a next hop in a path vector routing protocol (e.g., BGP) path from cloud service providers 310 to customers 308. As a result, each cloud exchange point 328 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 310 to customers. In other words, cloud exchange points 328 may internalize the eBGP peering relationships that cloud service providers 310 and customers 308 would maintain on a pair-wise basis. Instead, a customer 308 may configure a single eBGP peering relationship with a cloud exchange point 328 and receive, via the cloud exchange, multiple cloud services from one or more cloud service providers 310. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, customer 308C is illustrated as having contracted with a cloud exchange provider for cloud exchange 300 to directly access layer 3 cloud services via cloud exchange points 328C. In this way, customer 308C receives redundant layer 3 connectivity to cloud service provider 310A, for instance. Customer 308C, in contrast, is illustrated as having contracted with the cloud exchange provider for cloud exchange 300 to directly access layer 3 cloud services via cloud exchange point 328C and also to have contracted with NSP 306B to access layer 3 cloud services via a transit network of the NSP 306B. Customer 308B is illustrated as having contracted with multiple NSPs 306A, 306B to have redundant cloud access to cloud exchange points 328A, 328B via respective transit networks of the NSPs 306A, 306B. The contracts described above are instantiated in network infrastructure of the cloud exchange points 328 by L3 peering configurations within switching devices of NSPs 306 and cloud exchange points 328 and L3 connections, e.g., layer 3 virtual circuits, established within cloud exchange points 328 to interconnect cloud service provider 310 networks to NSPs 306 networks and customer 308 networks, all having at least one port offering connectivity within one or more of the cloud exchange points 328.

In some examples, cloud exchange 300 allows a corresponding one of customer customers 308A, 308B of any network service providers (NSPs) or "carriers" 306A-306B (collectively, "carriers 306") or other cloud customers including customers 308C to be directly connected, via a virtual layer 2 (L2) or layer 3 (L3) connection to any other customer network and/or to any of CSPs 310, thereby allowing direct exchange of network traffic among the customer networks and CSPs 310. The virtual L2 or L3 connection may be referred to as a "virtual circuit."

Carriers 306 may each represent a network service provider that is associated with a transit network by which network subscribers of the carrier 306 may access cloud services offered by CSPs 310 via the cloud exchange 300. In general, customers of CSPs 310 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 310 via the cloud exchange 300.

In this way, cloud exchange 300 streamlines and simplifies the process of partnering CSPs 310 and customers (via carriers 306 or directly) in a transparent and neutral manner. One example application of cloud exchange 300 is a co-location and interconnection data center in which CSPs 310 and carriers 306 and/or customers 308 may already have network presence, such as by having one or more accessible ports available for interconnection within the data center, which may represent any of cloud exchange points 328. This allows the participating carriers, customers, and CSPs to have a wide range of interconnectivity options within the same facility. A carrier/customer may in this way have options to create many-to-many interconnections with only a one-time hook up to one or more cloud exchange points 328. In other words, instead of having to establish separate connections across transit networks to access different cloud service providers or different cloud services of one or more cloud service providers, cloud exchange 300 allows customers to interconnect to multiple CSPs and cloud services.

Cloud exchange 300 includes a programmable network platform 320 for dynamically programming cloud exchange 300 to responsively and assuredly fulfill service requests that encapsulate business requirements for services provided by cloud exchange 300 and/or cloud service providers 310 coupled to the cloud exchange 300. Programmable network platform 320 may include a network service orchestrator 332 that handles tenant (e.g., cloud client) requests for deployment of VNFs. For example, network service orchestrator 332 may organize, direct and integrate underlying services through VMs 136 (or containers), as well as other software and network sub-systems, for managing various services (e.g., deployment of VNFs). The programmable network platform 320 may, as a result, orchestrate a business-level service across heterogeneous cloud service providers 310 according to well-defined service policies, quality of service policies, service level agreements, and costs, and further according to a service topology for the business-level service.

The programmable network platform 320 enables the cloud service provider that administers the cloud exchange 300 to dynamically configure and manage the cloud exchange 300 to, for instance, facilitate virtual connections for cloud-based services delivery from multiple cloud service providers 310 to one or more cloud customers 308. The cloud exchange 300 may enable cloud customers 308 to bypass the public Internet to directly connect to cloud services providers 310 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

In other examples, programmable network platform 320 enables the cloud service provider to configure cloud exchange 300 with a L3 instance requested by a cloud customer 308, as described herein. A customer 308 may request an L3 instance to link multiple cloud service providers by the L3 instance, for example (e.g., for transferring the customer's data between two cloud service providers, or for obtaining a mesh of services from multiple cloud service providers).

Programmable network platform 320 may represent an application executing within one or more data centers of the cloud exchange 300 or alternatively, off-site at a back office or branch of the cloud provider (for instance). Programmable network platform 320 may be distributed in whole or in part among the data centers, each data center associated with a different cloud exchange point 328 to make up the cloud exchange 300. Although shown as administering a single cloud exchange 300, programmable network platform 320 may control service provisioning for multiple different cloud exchanges. Alternatively or additionally, multiple separate instances of the programmable network platform 320 may control service provisioning for respective multiple different cloud exchanges.

In the illustrated example, programmable network platform 320 includes a service interface (or "service API") 314 that defines the methods, fields, and/or other software primitives by which applications 330, such as a customer portal, may invoke the programmable network platform 320. The service interface 314 may allow carriers 306, customers 308, cloud service providers 310, and/or the cloud exchange provider programmable access to capabilities and assets of the cloud exchange 300 according to techniques described herein.

For example, the service interface 314 may facilitate machine-to-machine communication to enable dynamic provisioning of virtual circuits in the cloud exchange for interconnecting customer and/or cloud service provider networks. In this way, the programmable network platform 320 enables the automation of aspects of cloud services provisioning. For example, the service interface 314 may provide an automated and seamless way for customers to establish, de-install and manage interconnections among multiple, different cloud providers participating in the cloud exchange.

Further example details of a cloud-based services exchange can be found in U.S. patent application Ser. No. 15/099,407, filed Apr. 14, 2016 and entitled "CLOUD-BASED SERVICES EXCHANGE;" U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" and U.S. patent application Ser. No. 14/927,306, filed Oct. 29, 2015 and entitled "ORCHESTRATION ENGINE FOR REAL-TIME CONFIGURATION AND MANAGEMENT OF INTERCONNECTIONS WITHIN A CLOUD-BASED SERVICES EXCHANGE;" each of which are incorporated herein by reference in their respective entireties.

Figure 4:
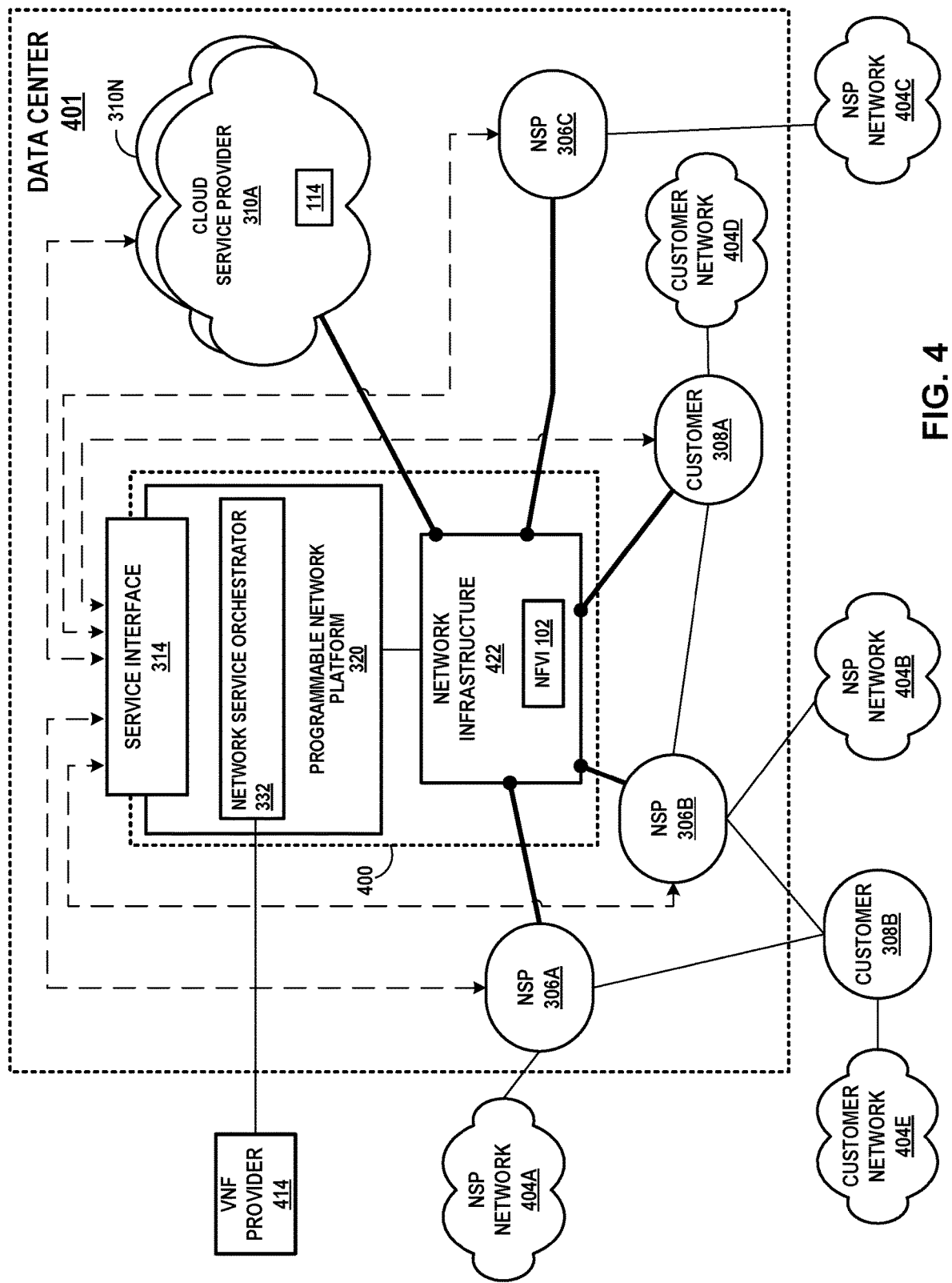
FIG. 4 is a block diagram illustrating an example data center that provides an operating environment for VNFs having isolated domains, in accordance with one or more aspects of the techniques described in this disclosure.

FIG. 4 is a block diagram illustrating an example data center 401 that provides an operating environment for providing VNFs having isolated domains, in accordance with one or more aspects of the techniques described in this disclosure. In this example data center, cloud exchange 300 allows a corresponding one of customer networks 402A, 402B and NSP networks 404A-404C (collectively, "'NSP or 'carrier' networks 404") of any NSPs 306A-306C or other customers to be directly cross-connected, via a layer 2 (L2) or layer 3 (L3) connection to any other customer network, thereby allowing exchange of service traffic among the customer networks and CSPs 310. Data center 401 may be entirely located within a centralized area, such as a warehouse or localized data center complex, and provide power, cabling, security, and other services to NSPs, customers, and cloud service providers that locate their respective networks within the data center 401 (e.g., for colocation) and/or connect to the data center 401 by one or more external links.

Cloud exchange 300 includes network infrastructure 422 and an operating environment by which customer networks 402 may receive services from one or more CSPs 310 via interconnections. In the example of FIG. 4, network infrastructure 422 represents the switching fabric of an interconnection facility of cloud exchange 300 and includes multiple ports that may be dynamically interconnected with virtual circuits by, e.g., invoking service interface 314 of the programmable network platform 320. Each of the ports is associated with NSPs 306, customers 308, and CSPs 310. This enables an NSP customer to have options to create many-to-many interconnections with only a one-time hook up to the switching network and underlying network infrastructure 422 that presents an interconnection platform for cloud exchange 300. In other words, instead of having to establish separate connections across transit networks to access different CSPs 310, cloud exchange 300 allows a customer to interconnect to multiple CSPs 310 using network infrastructure 422 within data center 401.

An interconnection as described herein may refer to, e.g., a physical cross-connect, an Ethernet connection such as a Layer 2 VPN or virtual private LAN (e.g., E-LINE, E-LAN, E-TREE, or E-Access), an Internet exchange-based interconnection in which respective network devices (e.g., routers and/or switches) of interconnected customers directly peer and exchange layer 3 routes for service traffic exchanged via network infrastructure 422, and a cloud exchange in which customer routers peer with network infrastructure 422 (or "provider") network devices rather than directly with other customers. Cloud exchange 300 may provide, to customers, interconnection services to network services provided by CSPs 310. That is, an interconnection service by cloud exchange 300 provides access to a network service (e.g., VNF) provided by CSPs 310.

For interconnections at layer 3 or above, customers 308 may receive services directly via a layer 3 peering and physical connection to one of colocation facility exchange points or indirectly via one of NSPs 306. NSPs 306 provide "transit" by maintaining a physical presence within data center 401 and aggregating layer 3 access from one or more customers 308. NSPs 306 may peer, at layer 3, directly with data center 401 and in so doing offer indirect layer 3 connectivity and peering to one or more customers 308 by which customers 308 may obtain services from the cloud exchange 300.

In instances in which cloud exchange 300 offers an internet exchange, network infrastructure 422 may be assigned a different autonomous system number (ASN). Network infrastructure 422 is thus a next hop in a path vector routing protocol (e.g., BGP) path from CSPs 310 to customers 308 and/or NSPs 306. As a result, cloud exchange 300 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more CSPs 310 to customers 308. In other words, cloud exchange 300 may internalize the eBGP peering relationships that CSPs 310 and customers 308 would maintain on a pair-wise basis. Instead, a customer 308 may configure a single eBGP peering relationship with cloud exchange 300 and receive, via the cloud exchange, multiple services from one or more CSPs 310. While described herein primarily with respect to eBGP or other layer 3 routing protocol peering between colocation facility points and customer, NSP, or service provider networks, the colocation facility points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above for a cloud exchange deployment, customer network 402B in FIG. 4 is illustrated as having contracted with the cloud exchange provider for cloud exchange 300 to directly access layer 3 services via cloud exchange 300 and also to have contracted with NSP 306B to access layer 3 services via a transit network of NSP 306B. Customer network 402A is illustrated as having contracted with NSP 306B to access layer 3 services via a transit network of NSP 306B. The contracts described above may be instantiated in network infrastructure 422 of the cloud exchange 300 by L3 peering configurations within switching devices of NSPs 306 and cloud exchange 300 and L3 connections, e.g., layer 3 virtual circuits, established within cloud exchange 300 to interconnect CSPs 310 to NSPs 306 and customer networks 402, all having at least one port offering connectivity within cloud exchange 300.

In some examples, network infrastructure 422 includes one or more virtual machines or containers of NFVi 102 that is used to deploy Virtualized Network Functions. In these examples, network service orchestrator 332 may receive a request via service interface 314 to deploy one or more virtualized network functions (e.g., virtual router) that are implemented in NFVi 102 of network infrastructure 422. Network service orchestrator 432 may request a VNF distribution including one or more VNF images from a VNF provider, e.g., VNF provider 414.

Further details regarding the example network system of FIG. 3 and example data center 401 of FIG. 4 may be found in U.S. Provisional Patent Application Ser. No. 62/908,976 entitled "VIRTUALIZED NETWORK FUNCTIONS VERIFICATION USING DECENTRALIZED IDENTIFIERS," filed on Oct. 1, 2019, which is hereby incorporated by reference herein.

Figure 5:
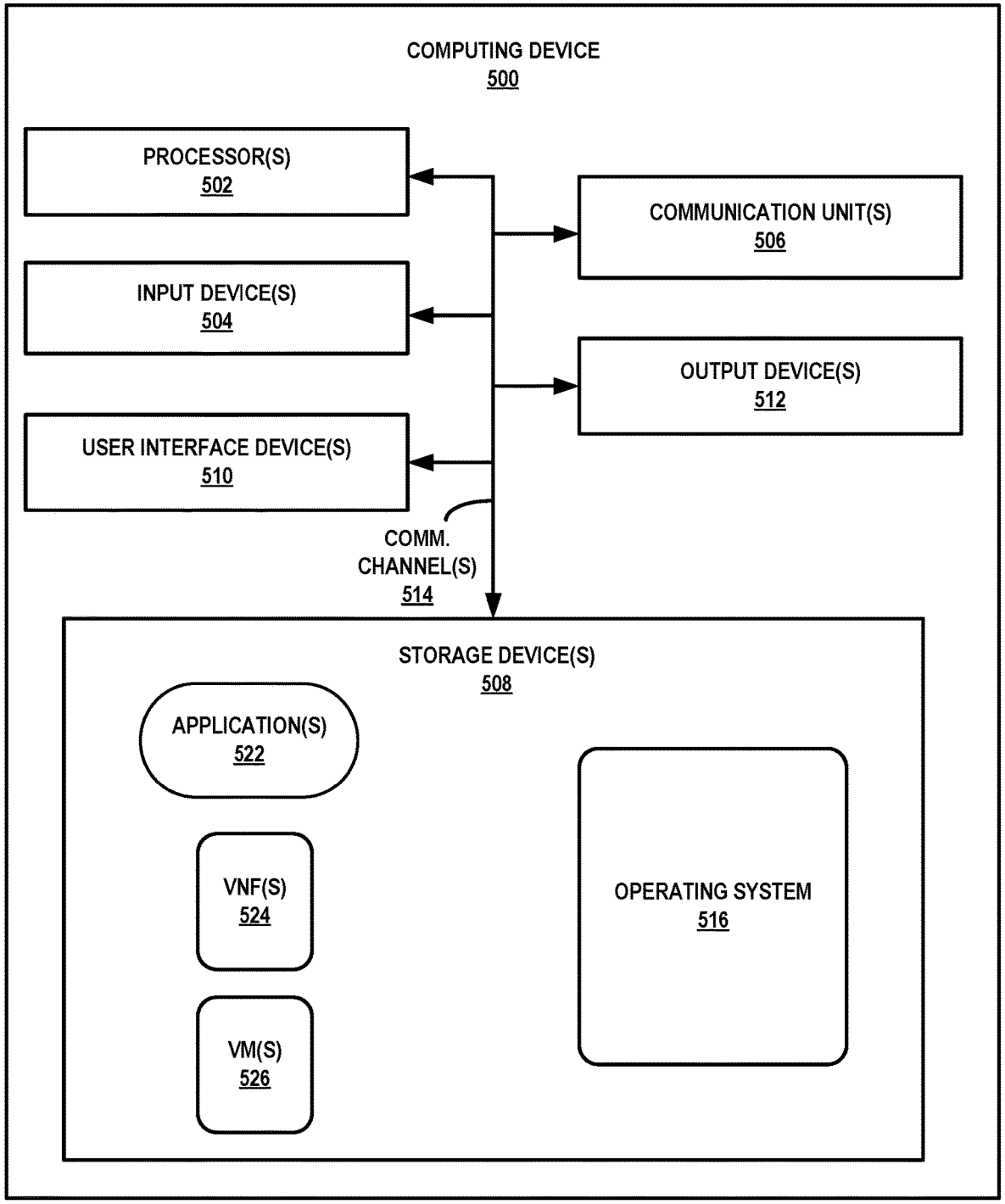
FIG. 5 is a block diagram illustrating further details of one example of a computing device that operates in accordance with one or more techniques of the present disclosure.

FIG. 5 is a block diagram illustrating further details of one example of a computing device that operates in accordance with one or more techniques of the present disclosure. FIG. 5 may illustrate a particular example of a server or other computing device 500 that includes one or more processor(s) 502 for executing any one or more of any system, application, or module described herein. For example, the one or more processor(s) 502 may execute VMs 526 and VNFs 524. Other examples of computing device 500 may be used in other instances. Although shown in FIG. 5 as a stand-alone computing device 500 for purposes of example, a computing device may be any component or system that includes one or more processors or other suitable computing environment for executing software instructions and, for example, need not necessarily include one or more elements shown in FIG. 5 (e.g., communication units 506; and in some examples components such as storage device(s) 508 may not be co-located or in the same chassis as other components).

As shown in the specific example of FIG. 5, computing device 500 includes one or more processors 502, one or more input devices 504, one or more communication units 506, one or more output devices 512, one or more storage devices 508, and user interface (UI) device 510, and communication unit 506. Computing device 500, in one example, further includes one or more applications 522, programmable network platform application(s) 524, and operating system 516 that are executable by computing device 500. Each of components 502, 504, 506, 508, 510, and 512 are coupled (physically, communicatively, and/or operatively) for inter-component communications. In some examples, communication channels 514 may include a system bus, a network connection, an inter-process communication data structure, or any other method for communicating data. As one example, components 502, 504, 506, 508, 510, and 512 may be coupled by one or more communication channels 514.

Processors 502, in one example, are configured to implement functionality and/or process instructions for execution within computing device 500. For example, processors 502 may be capable of processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within computing device 500 during operation. Storage device 508, in some examples, is described as a computer-readable storage medium. In some examples, storage device 508 is a temporary memory, meaning that a primary purpose of storage device 508 is not long-term storage. Storage device 508, in some examples, is described as a volatile memory, meaning that storage device 508 does not maintain stored contents when the computer is turned off. Examples of volatile memories include random access memories (RAM), dynamic random access memories (DRAM), static random access memories (SRAM), and other forms of volatile memories known in the art. In some examples, storage device 508 is used to store program instructions for execution by processors 502. Storage device 508, in one example, is used by software or applications running on computing device 500 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. In some examples, computing device 500 uses communication unit 506 to communicate with an external device.

Computing device 500, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522, VMs 526 and VNFs 524 with processors 502, communication unit 506, storage device 508, input device 504, user interface devices 510, and output device 512.

Application 522, VMs 526 and VNFs 524 may also include program instructions and/or data that are executable by computing device 500.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A computing device comprising:
   processing circuitry coupled to a memory;
   a virtual network function (VNF) configured for execution by the processing circuitry, wherein the VNF comprises:
   a cloud virtual domain communicatively coupling the VNF to a cloud service;
   a management virtual domain communicatively coupling the VNF to a management service; and
   an external virtual domain having a public Internet Protocol (IP) address, the external virtual domain configured to:
   receive, from a cloud client device on a public network, an authentication request providing access credentials for a VNF customer,
   provide the authentication request to the management service via the management virtual domain,
   receive an authentication response from the management service via the management virtual domain,
   in response to a determination that the authentication response indicates the access credentials are valid credentials for the VNF customer, initiate application of a policy that allows the cloud client device to configure the cloud virtual domain or the cloud service and disallows configuration of the external virtual domain and the management virtual domain.

2. The computing device of claim 1, wherein the authentication request comprises a secure shell (SSH) authentication request.

3. The computing device of claim 1, wherein the management service comprises an authentication service.

4. The computing device of claim 3, wherein the authentication service comprises a Terminal Access Controller Access-Control System (TACACS) service.

5. The computing device of claim 1, wherein the external virtual domain is further configured to:
   receive a second authentication request including second access credentials;
   in response to a determination that a second authentication response to the second authentication request indicates the second access credentials are valid credentials for an administrator of a data center hosting the VNF, initiate application of a policy that allows the administrator to configure the external virtual domain and the management virtual domain.

6. The computing device of claim 1, wherein the external virtual domain is further configured to determine if the cloud client device is allowed to access the VNF, and to reject the authentication request in response to a determination that the cloud client device is not allowed to access the VNF.

7. The computing device of claim 1, wherein the external virtual domain comprises a virtual router function (VRF), and wherein the VRF performs network address translation to translate a source IP address to an IP address associated with the management virtual domain and translates the destination IP address to an IP address of the management service and relays the authentication request to the management service via the management virtual domain.

8. The computing device of claim 1, wherein the external virtual domain comprises a virtual firewall, and wherein the management virtual domain further comprises a management agent configured to provide a proxy authentication request to the management service, the proxy authentication request having a source IP address of the management virtual domain.

9. The computing device of claim 1, wherein the VNF is communicatively coupled to a public gateway, wherein the external virtual domain receives the network packet via the public gateway and wherein the public gateway isconfigured to determine that a source of the network packet is authorized to access the VNF.

10. A system comprising:
    a private cloud network;
    a private management network; and
    a virtualized network function (VNF) communicatively coupled to a public network, the VNF comprising:
    a cloud virtual domain communicatively coupling the VNF to a cloud service via the private cloud network,
    a management virtual domain communicatively coupling the VNF to a management service via the private management network, and
    an external virtual domain configured to:
    receive, from a cloud client device via the public network, an authentication request providing access credentials for a VNF customer,
    provide the authentication request to the management service via the management virtual domain,
    receive an authentication response from the management service via the management virtual domain,
    in response to a determination that the authentication response indicates the access credentials are valid credentials for the VNF customer, initiate application of a policy that allows the cloud client device to configure the cloud virtual domain or the cloud service and disallows configuration of the external virtual domain and the management virtual domain.

11. The system of claim 10, wherein the authentication request comprises a secure shell (SSH) authentication request.

12. The system of claim 10, wherein the management service comprises an authentication service.

13. The system of claim 12, wherein the authentication service comprises a Terminal Access Controller Access-Control System (TACACS) service.

14. The system of claim 10, wherein the external virtual domain is further configured to:
    determine if the cloud client device is allowed to access the VNF; and
    reject the authentication request in response to a determination that the cloud client device is not allowed to access the VNF.

15. The system of claim 10, wherein the external virtual domain comprises a virtual router function (VRF), and wherein the VRF performs network address translation to translate a source IP address to an IP address associated with the management virtual domain and translates the destination IP address to an IP address of the management service and relays the authentication request to the management service via the management virtual domain.

16. The system of claim 10, wherein the external virtual domain comprises a virtual firewall, and wherein the management virtual domain further comprises a management agent configured to provide a proxy authentication request to the management service, the proxy authentication request having a source IP address of the management virtual domain.

17. The system of claim 10, further comprising a public gateway having an access control list (ACL) specifying one or more customer network devices permitted to provide network traffic to the VNF.

18. A method comprising:
receiving, by an external virtual domain of a virtualized network function (VNF) executable by one or more processors, an authentication request from a cloud client device on a public network, the authentication request including access credentials for a VNF customer;
providing the authentication request to a management service via a management virtual domain of the VNF;
receiving an authentication response from the management service via the management virtual domain; and
in response to determining that the authentication response indicates the access credentials are valid credentials for the VNF customer, initiating application of a policy that allows the cloud client device to configure a cloud virtual domain or a cloud service and disallows the cloud client device from configuration of the external virtual domain and the management virtual domain.

19. The method of claim 18, wherein the external virtual domain comprises a virtual router function (VRF), and wherein providing the authentication request to the management service via the management virtual domain of the VNF comprises:
performing network address translation to translate a source IP address to an IP address associated with the management virtual domain and translates the destination IP address to an IP address of the management service; and
relaying the authentication request to the management service via the management virtual domain.

20. The method of claim 18, wherein the external virtual domain comprises a virtual router function (VRF), and wherein providing the authentication request to the management service via the management virtual domain of the VNF comprises: relaying the authentication request to a management agent of the management virtual domain, the management agent configured to provide a proxy authentication request to the management service; the proxy authentication request having a source IP address of the management virtual domain.

* * * * *